United States Patent
Elhossini et al.

(10) Patent No.: US 12,417,710 B2
(45) Date of Patent: Sep. 16, 2025

(54) UNMANNED AERIAL VEHICLE SEARCH AND RESCUE SYSTEMS AND METHODS

(71) Applicant: FLIR Unmanned Aerial Systems ULC, Vancouver (CA)

(72) Inventors: Ahmed Elhossini, Waterloo (CA); Fei Yu, Waterloo (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 231 days.

(21) Appl. No.: 17/669,321

(22) Filed: Feb. 10, 2022

(65) Prior Publication Data

US 2022/0262263 A1    Aug. 18, 2022

Related U.S. Application Data

(60) Provisional application No. 63/150,002, filed on Feb. 16, 2021.

(51) Int. Cl.
*H04N 23/90* (2023.01)
*B64U 10/14* (2023.01)
(Continued)

(52) U.S. Cl.
CPC ............. *G08G 5/70* (2025.01); *B64U 10/14* (2023.01); *G06F 3/04842* (2013.01); *G06V 20/17* (2022.01); *G08G 5/32* (2025.01); *G08G 5/55* (2025.01); *G08G 5/57* (2025.01); *H04N 23/695* (2023.01); *H04N 23/90* (2023.01); *B64U 20/87* (2023.01); *B64U 2101/30* (2023.01); *B64U 2101/56* (2023.01); *B64U 2201/104* (2023.01)

(58) Field of Classification Search
CPC .. G08G 5/0073; G08G 5/0034; G08G 5/0069; G08G 5/0021; B64C 39/024; B64D 47/08; G06F 3/04842; G06V 20/17; G06V 10/751; H04N 23/695; H04N 23/80; H04N 23/90; B64U 2101/30; B64U 2201/104; B64U 10/14; B64U 20/87; B64U 2101/55; G05D 1/0094
See application file for complete search history.

(56) References Cited

U.S. PATENT DOCUMENTS 9,841,761 B2    12/2017    Shehata et al.
10,216,181 B2   2/2019     Fox et al.
(Continued)

FOREIGN PATENT DOCUMENTS

CN    111563464 A * 8/2020 ......... G06F 18/2415

OTHER PUBLICATIONS

"Sun et al., A Camera-Based Target Detection and Positioning UAV System for Search and Rescue (SAR) Purposes, 2016, Sensors (Basel, Switzerland)" (Year: 2016).*
(Continued)

*Primary Examiner* — Anshul Sood
(74) *Attorney, Agent, or Firm* — Haynes and Boone, LLP

(57) ABSTRACT

Systems and methods for unmanned aerial vehicle (UAV) search and rescue operations are provided. A UAV may include a camera configured to capture one or more images of a search area. The UAV may include at least one logic device configured to calculate a flight pattern for searching the search area, receive a target image, and analyze the one or more images of the search area to identify a target matching the target image.

20 Claims, 7 Drawing Sheets

(51) Int. Cl.
  *G06F 3/04842* (2022.01)
  *G06V 20/17* (2022.01)
  *G08G 5/32* (2025.01)
  *G08G 5/55* (2025.01)
  *G08G 5/57* (2025.01)
  *G08G 5/70* (2025.01)
  *H04N 23/695* (2023.01)
  *B64U 20/87* (2023.01)
  *B64U 101/30* (2023.01)
  *B64U 101/56* (2023.01)

(56) References Cited

U.S. PATENT DOCUMENTS

| | | | |
|---|---|---|---|
| 10,417,918 B2 | 9/2019 | Reddy et al. | |
| 10,668,997 B2 | 6/2020 | Moses et al. | |
| 2010/0017046 A1* | 1/2010 | Cheung | G05D 1/104 |
| | | | 701/2 |
| 2012/0288199 A1* | 11/2012 | Kanda | G06T 7/143 |
| | | | 382/173 |
| 2015/0213328 A1* | 7/2015 | Mase | G06F 18/22 |
| | | | 382/201 |
| 2016/0340006 A1 | 11/2016 | Tang | |
| 2017/0088261 A1 | 3/2017 | Sequeira et al. | |
| 2017/0322551 A1* | 11/2017 | Zang | G08G 5/0069 |
| 2018/0024571 A1* | 1/2018 | Peasgood | G05D 1/102 |
| | | | 244/7 C |
| 2021/0117687 A1* | 4/2021 | Ren | G06V 10/764 |

OTHER PUBLICATIONS

"FLIR, The Next-Generation Skyranger FLIR Skyranger R70," Jan. 28, 2021, Downloaded on Feb. 6, 2024 from https://studylib.net/doc/25932178/skyranger-r70-brochure-us (Year: 2021).*

Alves de Araujo, Sidnei, "Ciratefi: An RST-invariant template matching with extension to color extensions", Integrated Computer Aided Engineering, 18(1), pp. 75-90, Jan. 2011.

* cited by examiner

UNMANNED AERIAL VEHICLE SEARCH AND RESCUE SYSTEMS AND METHODS

CROSS-REFERENCE TO RELATED APPLICATIONS

This application claims priority to and the benefit of U.S. Provisional Patent Application No. 63/150,002 filed Feb. 16, 2021 and entitled "UNMANNED AERIAL VEHICLE SEARCH AND RESCUE SYSTEMS AND METHODS," which is incorporated herein by reference in its entirety.

TECHNICAL FIELD

The present invention relates generally to search and rescue systems and, more particularly, to systems and methods for unmanned aerial vehicle search and rescue operations.

BACKGROUND

In search and rescue operations (e.g., a search for a missing person in the wild, for example), a large area of land often needs to be covered in a short amount of time. Delayed rescue can cause undesired consequences. Unmanned aerial vehicles (UAVs) can fly the search area, but often the UAVs are limited in their ability to effectively locate a target, such as due to device or operator error. For example, pilots of UAV may be required to locate the target themselves while viewing a video feed from the drone.

Therefore, there is a need in the art for systems and methods that address the deficiencies noted above, other deficiencies known in the industry, or at least offers an alternative to current techniques. For example, improvements are needed that allow a UAV to complete a search and rescue task with minimal pilot intervention.

SUMMARY

Systems and methods for unmanned aerial vehicle (UAV) search and rescue operations are provided. One or more embodiments of the present disclosure provide a UAV. The UAV may include a camera configured to capture one or more images of a search area. The UAV may include at least one logic device configured to calculate a flight pattern for searching the search area, receive a target image, and analyze the one or more images of the search area to identify a target matching the target image.

One or more embodiments provide a system. The system may include a user interface and a UAV in communication with the user interface. The user interface may be configured to receive user input identifying a search area. The UAV may include a camera configured to capture one or more images of the search area. The system may include a flight module configured to calculate a flight pattern of the UAV for searching the search area. The system may include an imagery module configured to receive a target image and analyze the one or more images of the search area to identify a target matching the target image.

One or more embodiments provide a method. The method may include receiving a target image; calculating a flight pattern of a UAV for searching a search area; capturing, using a camera of the UAV, one or more images of the search area; and analyzing the one or more images to identify a target matching the target image.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Embodiments described herein provide an unmanned aerial vehicle (UAV) configured to facilitate search and rescue operations (e.g., a search for a missing person in the wild for example). The UAV may perform one or more search operations with various flexible and autonomous features. For example, the UAV may autonomously fly over a search area (e.g., a selected or pilot-defined area on a map) in search of a target (e.g., a person, a vehicle, a landmark, etc.). The UAV may automatically identify the target, as well as other associated tasks, with minimal pilot intervention.

Figure 1:
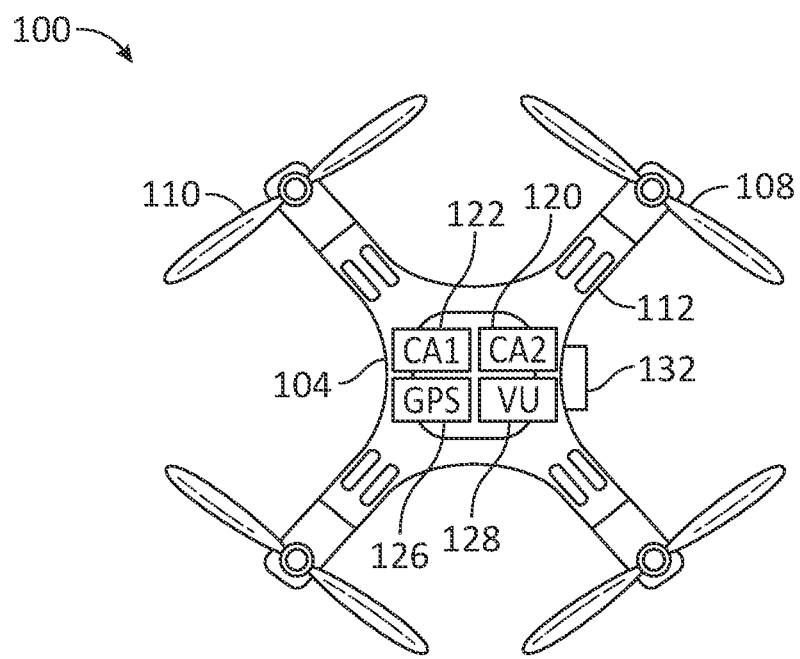
FIG. 1 illustrates a diagram of an unmanned aerial vehicle (UAV), in accordance with an embodiment of the disclosure.

FIG. 1 illustrates a diagram of an unmanned aerial vehicle (UAV) 100, in accordance with an embodiment of the disclosure. As described herein, the UAV 100 may be configured to fly/cover a search area in connection with a search and rescue operation or system. For instance, UAV 100 may function to fly (e.g., autonomously) over a predefined search area to facilitate locating a target (e.g., a person, a vehicle, a significant landmark, etc.), such as searching for a missing person or other target in the wild or within a geographical area. As described more fully below, the UAV 100 may automatically identify the target and perform the complete search and rescue task with minimal pilot intervention. For example, the UAV 100 may fly autonomously in a defined pattern while taking snapshots/images of a search area at a specific rate. In this manner, the UAV 100 may facilitate search and rescue operations, such as reducing search time and/or limiting human error.

The UAV 100 may be any pilotless aircraft, such as an airplane, helicopter, drone, or other machine capable of flight. The UAV 100, which may be referred to as a drone or an unmanned aerial system (UAS), may be any flying object capable of hovering in the air at a defined location. The UAV 100 may by piloted autonomously or via remote control. For example, the UAV 100 may be any aircraft piloted by remote control or onboard computers. The UAV 100 may include a fixed-wing, rotorcraft, or quadcopter design, although other configurations are contemplated. As a result, the term "UAV" or "drone" is characterized by function and not by shape or flight technology.

Referring to FIG. 1, the UAV 100 may include a body 104 and a propulsion system 108. The propulsion system 108 may be configured to propel the UAV 100 for flight. For example, the propulsion system 108 may include one or more propellers 110 (e.g., a plurality of propellers 110, such as four propellers 110) connected to the body 104, such as via respective arms or wings 112 extending from body 104. Depending on the application, the propellers 110 may have a fixed orientation, or the propellers 110 may move, to provide a desired flight characteristic. Operation of UAV 100 may be substantially autonomous and/or partially or completely controlled by a remote system (e.g., a remote control, a tablet, a smartphone, etc.), as described more fully below.

The body 104 may be equipped with at least one logic device, such as a first logic device 120 and a second logic device 122. Each logic device, which may be referred to as an on-board computer, may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of UAV 100 and/or other elements of a system, for example. Such software instructions may implement methods for processing images and/or other sensor signals, determining sensor information, providing user feedback, querying devices for operational parameters, selecting operational parameters for devices, or performing any of the various operations described herein (e.g., operations performed by one or more devices of UAV 100).

In addition, a non-transitory medium may be provided for storing machine readable instructions for loading into and execution by first logic device 120 and/or second logic device 122. In these and other embodiments, each logic device may be implemented with other components where appropriate, such as volatile memory, non-volatile memory, one or more interfaces, and/or various analog and/or digital components for interfacing with devices of UAV 100. For example, first logic device 120 and/or second logic device 122 may be adapted to store sensor signals, sensor information, and/or operational parameters, over time, for example, and provide such stored data to a user. In some embodiments, first logic device 120 and/or second logic device 122 may be integrated with one or more other elements of UAV 100, for example, or distributed as multiple logic devices within UAV 100.

The first logic device 120 may be configured to perform a first set of operations. For example, the first logic device 120, which may be referred to as a flight module, may be configured for flight control and position estimation, among other operations. In embodiments, first logic device 120 may be configured to calculate a flight pattern for UAV 100. For example, the first logic device 120 may be configured to calculate a flight pattern for searching a search area. For position estimation, the UAV 100 may be equipped with a GPS module 126 to provide position measurements. Additionally, or alternatively, the UAV 100 may include one or more inertial measurement units (hereinafter IMU 128 individually and collectively) to provide frequent measurements to first logic device 120 for position estimation.

The second logic device 122 may be configured to perform a second set of operations. For instance, the second logic device 122, which may be referred to as an imagery module, may be configured for video/image processing and communication. Specifically, second logic device 122 may process one or more images captured by one or more cameras of UAV 100 in connection with search and rescue operations, as described below. The second logic device 122 may allow wireless communication between the UAV 100 and one or more external devices, such as a user interface, additional UAVs, a remote control, etc. Although flight module and imagery module are described with reference to first and second logic devices 120, 122, the flight module and imagery module may be embodied as separate modules of a single logic device.

The UAV 100 may include other modules, such as other and/or additional sensors, actuators, communications modules/nodes, and/or user interface devices used to provide additional operational and/or environmental information, for example. In some embodiments, other modules may include navigational or environmental sensors providing measurements and/or other sensor signals that can be displayed to a user and/or used to provide operational control of UAV 100, as described herein. In various embodiments, other modules may include a power supply implemented as any power storage device configured to provide enough power to each element of UAV 100 to keep all such elements active and operable.

Figure 2:
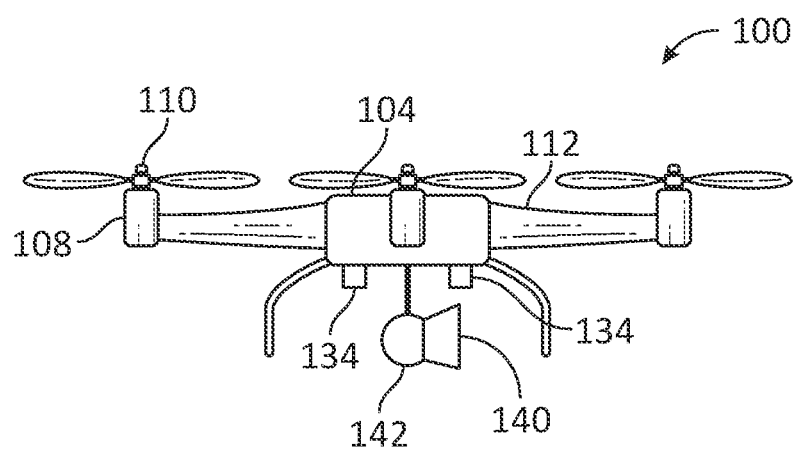
FIG. 2 illustrates a diagram of a side view of the UAV and showing a camera in a first position, in accordance with an embodiment of the disclosure.
Figure 3:
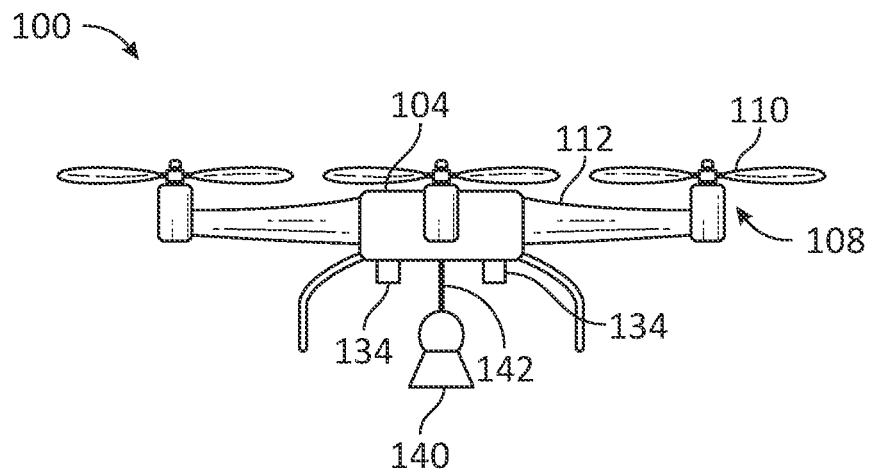
FIG. 3 illustrates a diagram of a side view of the UAV and showing the camera in a second position, in accordance with an embodiment of the disclosure.

FIG. 2 illustrates a diagram of a side view of the UAV 100 and showing a camera in a first position, in accordance with an embodiment of the disclosure. FIG. 3 illustrates a diagram of a side view of the UAV 100 and showing the camera in a second position, in accordance with an embodiment of the disclosure. Referring to FIGS. 1-3, UAV 100 may include one or more cameras, such as several cameras pointing in several directions. For example, UAV 100 may include a plurality of navigation cameras supporting a position estimation of the UAV 100. Referring to FIG. 1, the UAV 100 may include a front camera 132 pointing in the direction of travel. Referring to FIGS. 2-3, the UAV 100 may include multiple side cameras 134 pointing down and to the sides of body 104. The navigation cameras may support position estimation when GPS data is inaccurate. For example, images from the navigation cameras may be provided to second logic device 122 for analysis. A final position estimation may be performed by the first logic device 120, where first logic device 120 combines all the measurements from GPS module 126, IMU 128, and navigation cameras (e.g., as processed by second logic device 122).

With continued reference to FIGS. 2-3, UAV 100 may include a camera 140 configured to capture one or more images of a search area. The camera 140, which may be referred to as a search camera or a main payload camera, may include a gimbal 142 securing the camera 140 to the body 104. The gimbal 142 may be configured to point the camera 140 independent of a position and/or orientation of the body 104. For instance, gimbal 142 may have three degrees of freedom, although other configurations are contemplated. As a result, camera 140 may be pointed at any target independent of UAV position and orientation.

As shown, the camera 140 may be movable to orient the camera 140 as desired. For example, referring to FIG. 2, the camera 140 may be positionable in a first position, such as pointing forward. Referring to FIG. 3, the camera 140 may be positionable in a second position, such as pointing down. The first position may be associated with a first mode of UAV 100, such as general flight, landing, or take-off. The second position may be associated with a second mode of UAV 100, such as a search mode. For example, when UAV 100 is actively searching a search area, the camera 140 may be moved to the second position to facilitate search operations.

Camera 140 may be configured to capture visible and non-visible images. For example, the camera 140 may be configured to capture visible, infrared, and/or thermal infrared images, among others. Camera 140 may include an array of sensors (e.g., a multi-sensor suite) for capturing thermal images (e.g., thermal image frames) in response to infrared radiation. In this way, camera 140 may be referred to as a thermal imager. Camera 140 may capture short-wave infrared (SWIR) light (e.g., 1-2 μm wavelengths), mid-wave infrared (MWIR) light (e.g., 3-5 μm wavelengths), and/or long-wave infrared (LWIR) light (e.g., 8-15 μm wavelengths). In this way, camera 140 may facilitate day or night search and rescue operations. For example, camera 140 may be utilized to search for a target with a unique thermal signature, independent of the time of day and irrespective of ground cover of other features limiting visible identification of the target (e.g., low light, camouflage, barriers, etc.). In embodiments, camera 140 may capture visible and infrared fused images. For instance, both a visible and a thermal representation of a scene (e.g., a search area) may be captured and/or presented to the pilot or another user of the system.

Figure 4:
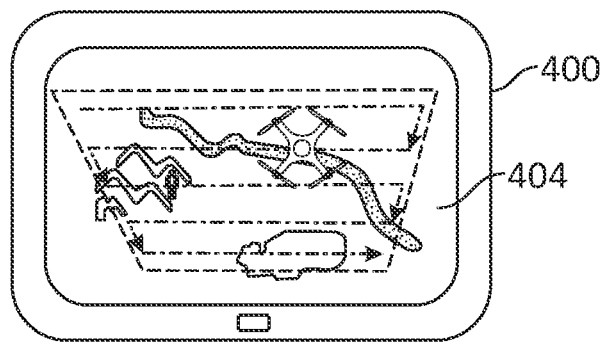
FIG. 4 illustrates a diagram of a user interface, in accordance with an embodiment of the disclosure.

FIG. 4 illustrates a diagram of a user interface 400, in accordance with an embodiment of the disclosure. User interface 400 may be implemented as one or more of a display, a touch screen, a keyboard, a mouse, a joystick, a knob, a steering wheel, and/or any other device capable of accepting user input and/or providing feedback to a user. In various embodiments, user interface 400 may be adapted to provide user input to other devices of the system, such as UAV 100. User interface 400 may also be implemented with one or more logic devices that may be adapted to store and/or execute instructions, such as software instructions, implementing any of the various processes and/or methods described herein. For example, user interface 400 may be adapted to form communication links, transmit and/or receive communications (e.g., sensor signals, control signals, sensor information, user input, and/or other information), for example, or to perform various other processes and/or methods described herein The pilot may have control of the UAV 100 and access to UAV data using user interface 400. For example, the user interface 400 may be connected to the UAV 100 using a wireless link, such as a wireless link having enough bandwidth for video and data transmission. User interface 400 may include an image panel and an input panel. In embodiments, user interface 400 may include a touch screen 404 that functions as both the image panel and the input panel. The image panel may be used to view image/video feeds from one or more cameras on-board UAV 100, such as camera 140, front camera 132, and/or side cameras 134. The input panel may be configured to receive user input. For example, input panel may allow the pilot to configure different UAV and/or search settings. Input panel may be used to identify a search area. In embodiments, user interface 400 may provide a map for the pilot to locate the UAV 100 during flight and/or identify the search area, as explained below. For example, the pilot may outline the search area on the map using a stylus or finger. In some embodiments, one or more accessories may be connected to the user interface 400, such as a joystick for better flight control of the UAV 100. As shown, the user interface 400 may be a tablet, although other configurations are contemplated.

Figure 5:
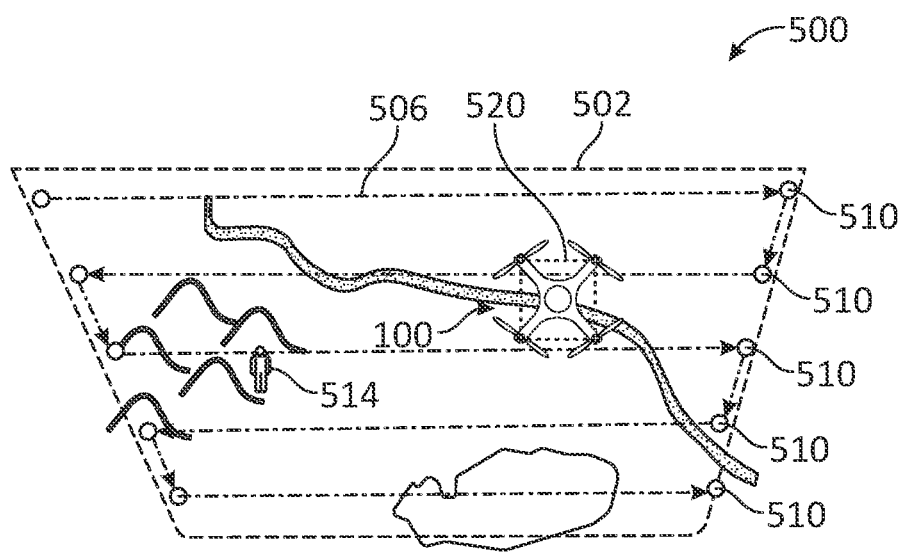
FIG. 5 illustrates a diagram of a map view of the user interface, in accordance with an embodiment of the disclosure.

FIG. 5 illustrates a diagram of a map view 500 of the user interface 400, in accordance with an embodiment of the disclosure. Referring to FIG. 5, the pilot may select a search area 502 using user interface 400 (outlined in dashed lines), such as using map view 500. A flight pattern or grid path 506 may be calculated to cover the search area 502. For example, UAV 100, such as first logic device 120 of UAV 100, may calculate the grid path 506 (e.g., an optimal grid path) to cover the search area 502, with the grid path 506 including a plurality of waypoints 510. The UAV 100 may fly the grid path 506 in search for a target 514 (e.g., a person, vehicle, landmark, etc.). For example, the UAV 100 may fly (e.g., autonomously) from one waypoint 510 to another until the search area 502 is covered and/or until the target 514 is located, as provided below. As shown, the grid path 506 may be overlaid on the search area 502 in the map view 500. The current position of UAV 100 may also be shown in map view 500.

The UAV 100 may be configured to calculate a frequency at which images are captured by the camera 140 during flight. The frequency may be based on the size or other physical feature of the search area 502. For instance, the distance between two waypoints 510 may be divided by the height of the rectangle covered by the camera 140 calculated from the camera's field of view (FOV 520). The frequency may be increased or decreased based on vegetation coverage (e.g., higher frequency in areas of increased vegetation, lower frequency in areas of decreased vegetation, etc.), geography (e.g., higher frequency based on hilly or undulating terrain, lower frequency based on flat terrain, etc.), or obstructions in the search area 502 (e.g., higher frequency based on increased obstructions within the FOV 520, lower frequency based on decreased obstructions within the FOV 520, etc.), among other factors.

Figure 6:
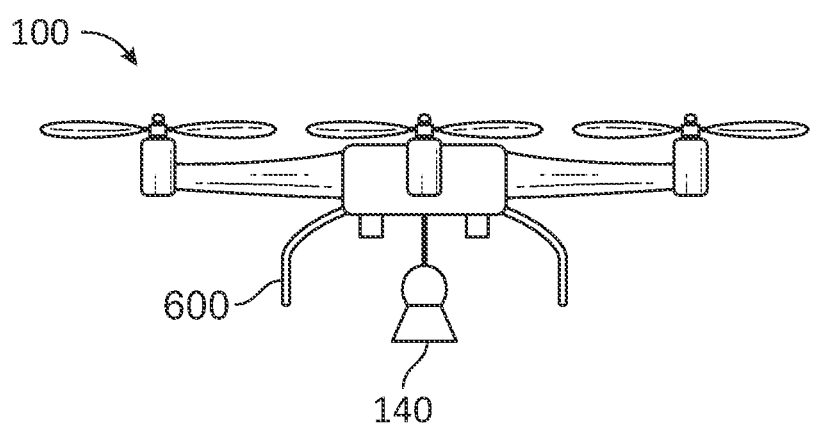
FIG. 6 illustrates a diagram of the UAV capturing a target image, in accordance with an embodiment of the disclosure.

FIG. 6 illustrates a diagram of the UAV 100 capturing a target image 600, in accordance with an embodiment of the disclosure. The target 514 may be represented to UAV 100 using a digital image. For example, a target image 600 may be uploaded to the UAV 100 using user interface 400, such as by the pilot highlighting or selecting a picture of the target 514. Referring to FIG. 6, the target image 600 may be captured by the UAV 100. For instance, the camera 140 may be pointed to a picture of the target 514, whereupon the camera 140 takes a snapshot/image of the picture. Depending on the application, at least one logic device (e.g., the second logic device 122) may receive the target image 600. User interface 400 may be used to confirm the target 514, whether uploaded to the UAV 100 or captured by the camera 140. In embodiments, the target image 600 may be provided as a thermal image.

Figure 7:
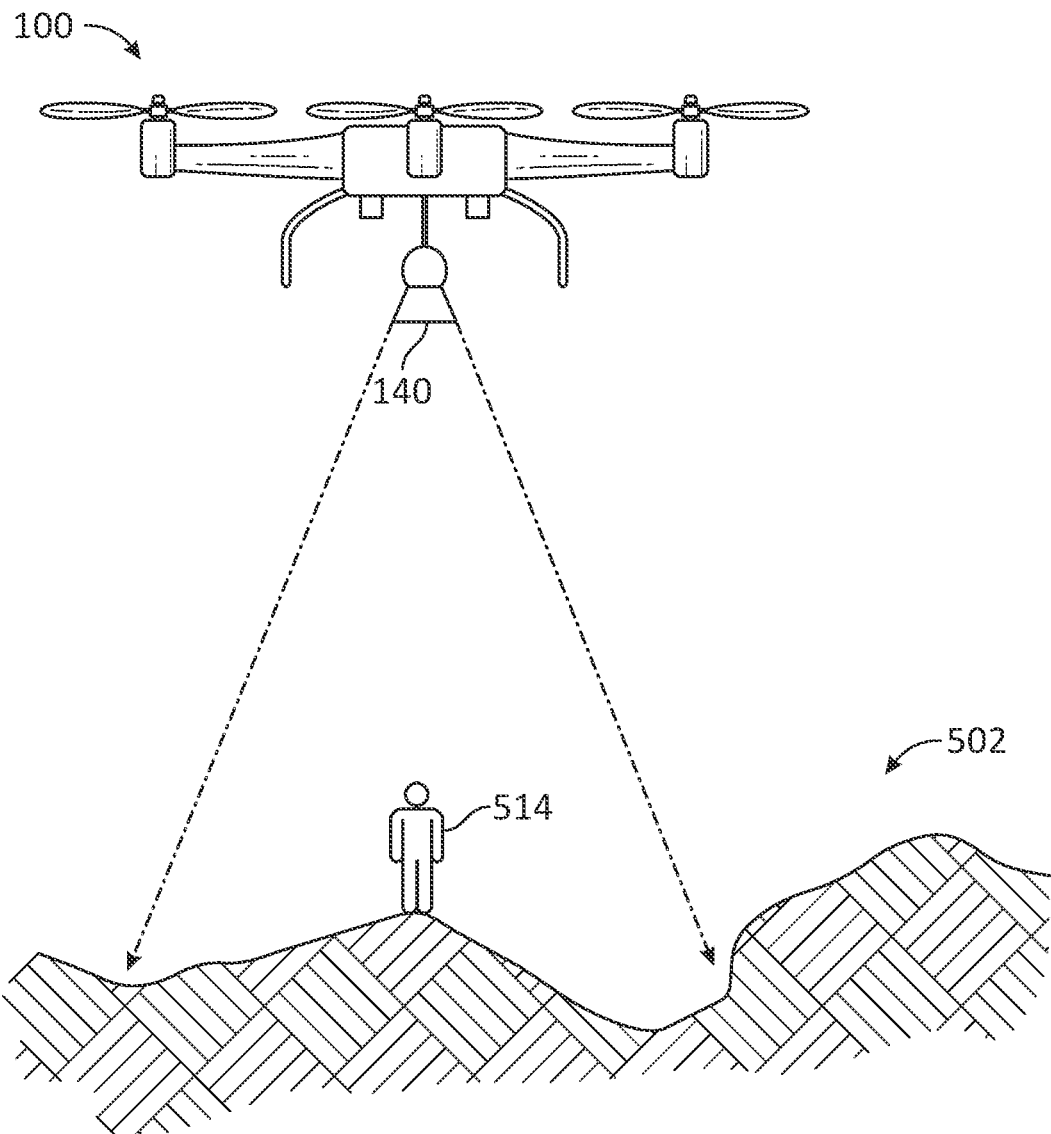
FIG. 7 illustrates a diagram of the UAV identifying a target, in accordance with an embodiment of the disclosure.

FIG. 7 illustrates a diagram of the UAV 100 identifying the target 514, in accordance with an embodiment of the disclosure. Referring to FIG. 7, the UAV 100 may perform a ground sweep of the search area 502. For example, UAV 100 may follow the grid path 506 calculated for the search area 502 while capturing images of the search area 502 using camera 140. During the ground sweep, images are captured by the camera 140 and analyzed in real time to find a match for target 514. For instance, visible and/or thermal indicators (e.g., signatures) of the captured images may be compared to the target image 600 to determine a match.

Depending on the application, at least one logic device (e.g., the second logic device 122) may analyze the images taken by camera 140 to locate target 514 in the images. If the target 514 is located, the UAV 100 may stop searching and hover above the target 514. In embodiments, UAV 100 may send updated imagery and/or target position to the user interface 400. For example, UAV 100 may send a live image/video feed of target 514 to user interface 400 for display. In embodiments, UAV 100 may be configured to send a notification to the user interface 400 based on a match between the target 514 and the target image 600. The notification may include geo-information to locate the target 514 on the ground. For example, the geo-information may include the target's geo-location relative to the location of the UAV 100 estimated using the GPS module 126.

Figure 8:
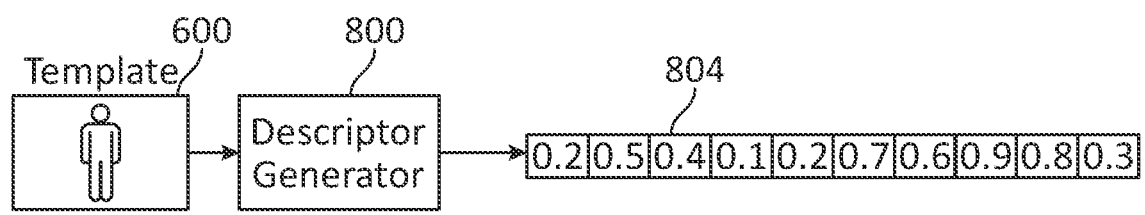
FIG. 8 illustrates a diagram of template generation, in accordance with an embodiment of the disclosure.
Figure 9:
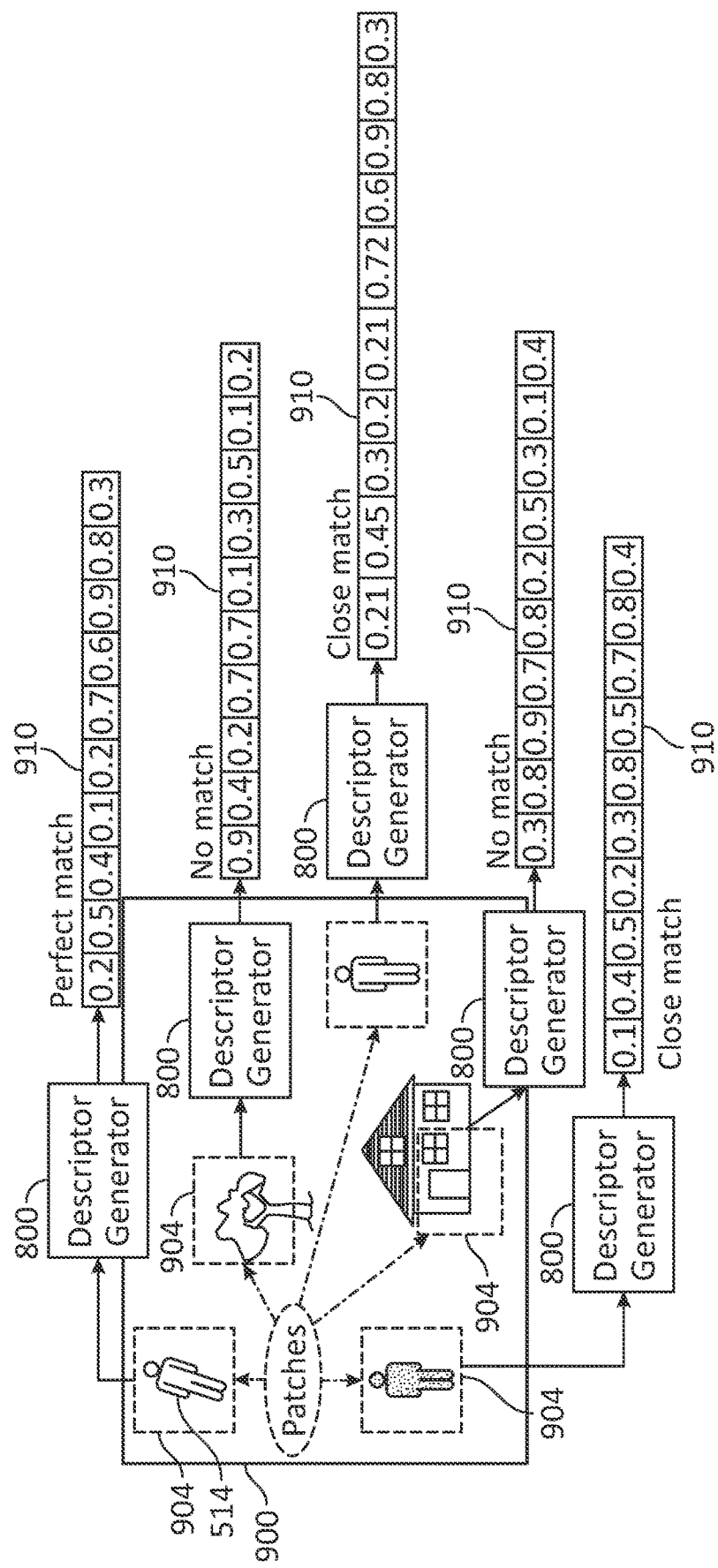
FIG. 9 illustrates a diagram of a template matching algorithm, in accordance with an embodiment of the disclosure.

FIG. 8 illustrates a diagram of template generation, in accordance with an embodiment of the disclosure. FIG. 9 illustrates a diagram of identifying target 514 using a template matching algorithm, in accordance with an embodiment of the disclosure. Referring to FIGS. 8-9, the target 514 may be identified using a template matching algorithm. For example, the target image 600 may be considered a template and the objective is to match the template to any part of an image 900 captured by camera 140. The template matching algorithm may be scale invariant. For instance, the size of the target 514 may not be known in advance, as well as how much the target 514 will be different between the target image 600 and the captured images 900. As a result, the target 514 may be represented in a way that is independent of its size in the image. Each image 900 of search area 502 captured by camera 140 may be divided into smaller patches 904. For each patch 904, the same representation may be calculated and compared.

In some embodiments, the template matching algorithm may be rotation invariant. For example, the orientation of the target 514 in the images 900 captured by camera 140 may not be the same as the template. The target image 600 may be represented in a way that is independent of its orientation. Patches 904 of the captured images 900 may be represented in a similar way. Furthermore, the position of the target 514 in the images 900 captured by camera 140 may not be known. Thus, the target image 600 must be compared to each part (or patch 904) of the captured images 900.

Referring to FIG. 8, a descriptor generator 800 may process the target image 600. The descriptor generator 800 may calculate a template descriptor 804 for the target image 600. The template descriptor 804 may represent the target 514 independent from size and orientation. Referring to FIG. 9, one or more patches 904 may be created in an image captured by camera 140. For example, multiple patches 904 may be created, such as a patch 904 around select points or areas in the image 900. In some embodiments, patches 904 may be created around the area or areas of the image 900 where there is a high probability for an object (i.e., target 514). In this way, a limited number of patches 904 may be created to make the search process faster and achieve real-time performance. In some embodiments, a patch 904 may be created at every pixel in the image 900.

With continued reference to FIG. 9, a patch descriptor 910 may be created for each patch 904, such as via the descriptor generator 800. One or more patch descriptors 910 may be compared to the template descriptor 804 to calculate a correlation between the template descriptor 804 and the patch descriptor(s) 910. The patch 904 with the highest correlation may be selected as a candidate match. If the correlation exceeds a specific threshold, the target 514 may be considered found. The geo-location of the target 514 may then be calculated based on the image and UAV position, as noted above.

Figure 10:
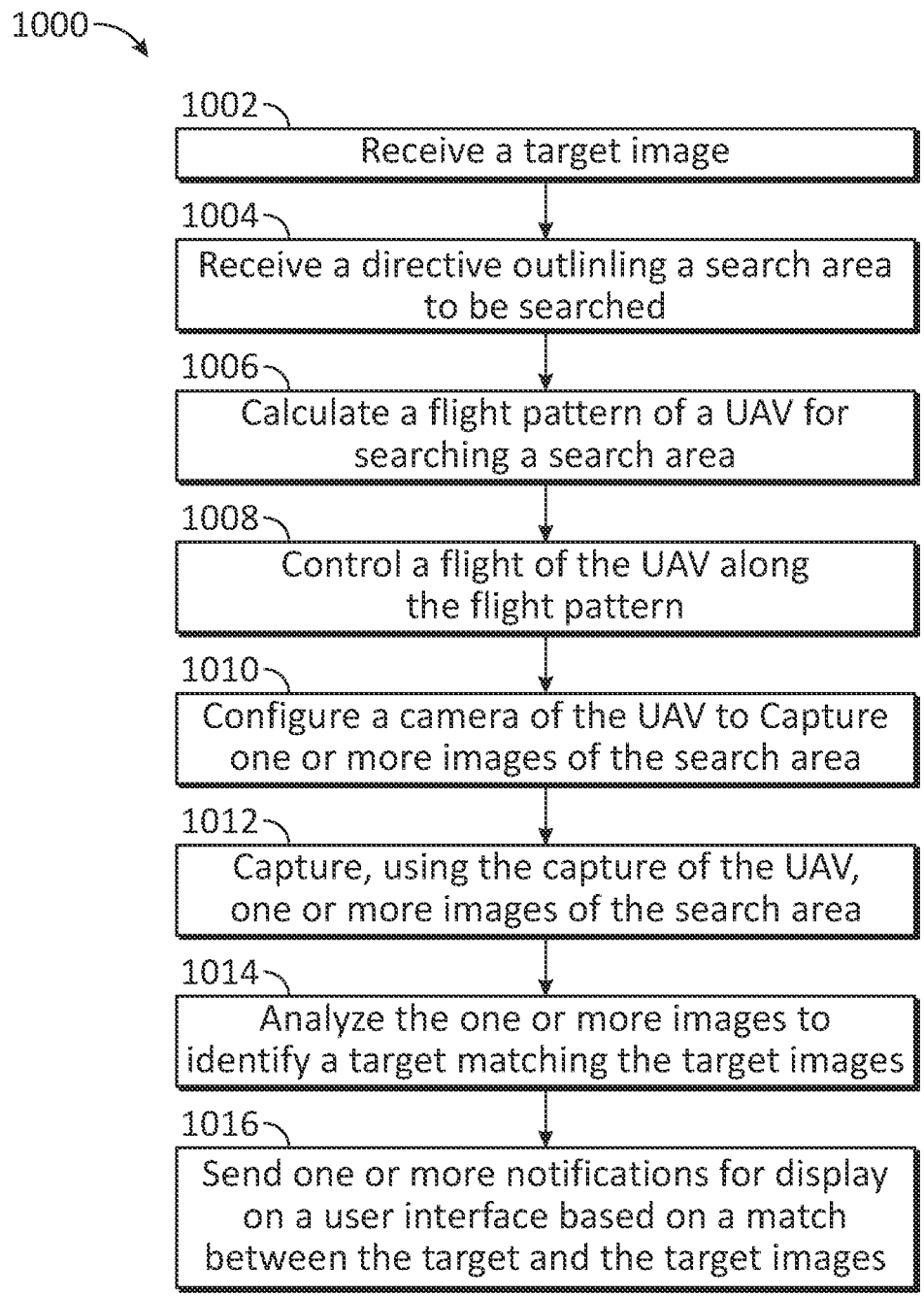
FIG. 10 illustrates a flow diagram of a process of identifying a target using a UAV, in accordance with an embodiment of the disclosure.

FIG. 10 illustrates a flow diagram of a process 1000 of identifying a target using a UAV, in accordance with an embodiment of the disclosure. The operations of FIG. 10 may be implemented as software instructions executed by one or more logic devices or controllers associated with corresponding electronic devices, sensors, and/or structures depicted in FIGS. 1-9. More generally, the operations of FIG. 10 may be implemented with any combination of software instructions, mechanical elements, and/or electronic hardware (e.g., inductors, capacitors, amplifiers, actuators, or other analog and/or digital components). Any step, sub-step, sub-process, or block of process 1000 may be performed in an order or arrangement different from the embodiment illustrated by FIG. 10. For example, in other embodiments, one or more blocks may be omitted from or added to process 1000. Furthermore, block inputs, block outputs, various sensor signals, sensor information, calibration parameters, and/or other operational parameters may be stored to one or more memories prior to moving to a following portion of a corresponding process. Although process 1000 is described with reference to systems described in FIGS. 1-9, process 1000 may be performed by other systems different from those systems and including a different selection of electronic devices, sensors, assemblies, mechanisms, platforms, and/or platform attributes.

In block 1002, process 1000 may include receiving a target image. For example, a target image may be uploaded to or stored within an unmanned aerial vehicle (UAV), such as UAV 100 described above. Block 1002 may include receiving the target image from a user interface. For instance, a pilot may select or capture an image using a tablet. The image may be transmitted to the UAV via a wireless link between the tablet and the UAV. Block 1002 may include capturing the target image using a camera of the UAV, such as camera 140 described above. For instance, the pilot may physically place a photo of the target at the front of the camera while the UAV is on the ground. The photo may be placed such that the target is fully visible in the camera's FOV (e.g., as visible in a video panel of the user interface).

In block 1004, process 1000 may include receiving a directive outlining a search area to be searched. Block 1004 may include receiving a selection of the search area from the user interface. For example, the pilot may outline the search area in a map view of the user interface, as described above. The search area may be sent to the UAV, such as from the user interface or from a network. For example, a remote operator on a network may define the search area for uploading to the UAV.

In block 1006, process 1000 may include calculating a flight pattern of the UAV for searching a search area. For example, the UAV may calculate a grid path having a plurality of waypoints. The flight pattern or grid path may be optimized for searching the search area. For example, the flight pattern or grid path may be based on the camera's FOV, a terrain of the search area, a predicted size of the target, or other factors.

In block 1008, process 1000 may include controlling a flight of the UAV along the flight pattern. The UAV may be controlled via remote control or the UAV may fly the flight pattern autonomously. For example, block 1008 may include autonomously flying the UAV between the waypoints calculated for the search area, such as from one waypoint to another until the flight pattern is complete or until the target is found. Block 1008 may include hovering the UAV above the target or a final waypoint of the plurality of waypoints, as noted above.

In block 1010, process 1000 may include configuring the camera to capture one or more images of the search area. For example, the camera may be rotated to point downwards as the UAV flies the flight pattern. In block 1012, process 1000 may include capturing, using the camera of the UAV, one or more images of the search area. For instance, images may be captured at a frequency sufficient to cover the search area (e.g., from multiple angles).

In block 1014, process 1000 may include analyzing the one or more images to identify a target matching the target image. Block 1014 may include comparing the target image to at least portions of the one or more images of the search area using a template matching algorithm, as described above. The template matching algorithm may compare a template descriptor calculated for the target image against a patch descriptor calculated for one or more patches of each image of the search area captured by the camera. Block 1014 may include identifying the target based on a correlation between the template descriptor and the patch descriptor. For example, a match may be determined if the correlation exceeds a threshold, as noted above.

In block 1016, process 1000 may include sending one or more notifications for display on the user interface based on a match between the target and the target image. For example, the target position may be provided to the pilot. In embodiments, a live video feed may be transmitted to the user interface for display. If the target is moving, the UAV (e.g., the camera) may automatically follow the target and update target position.

Figure 11:
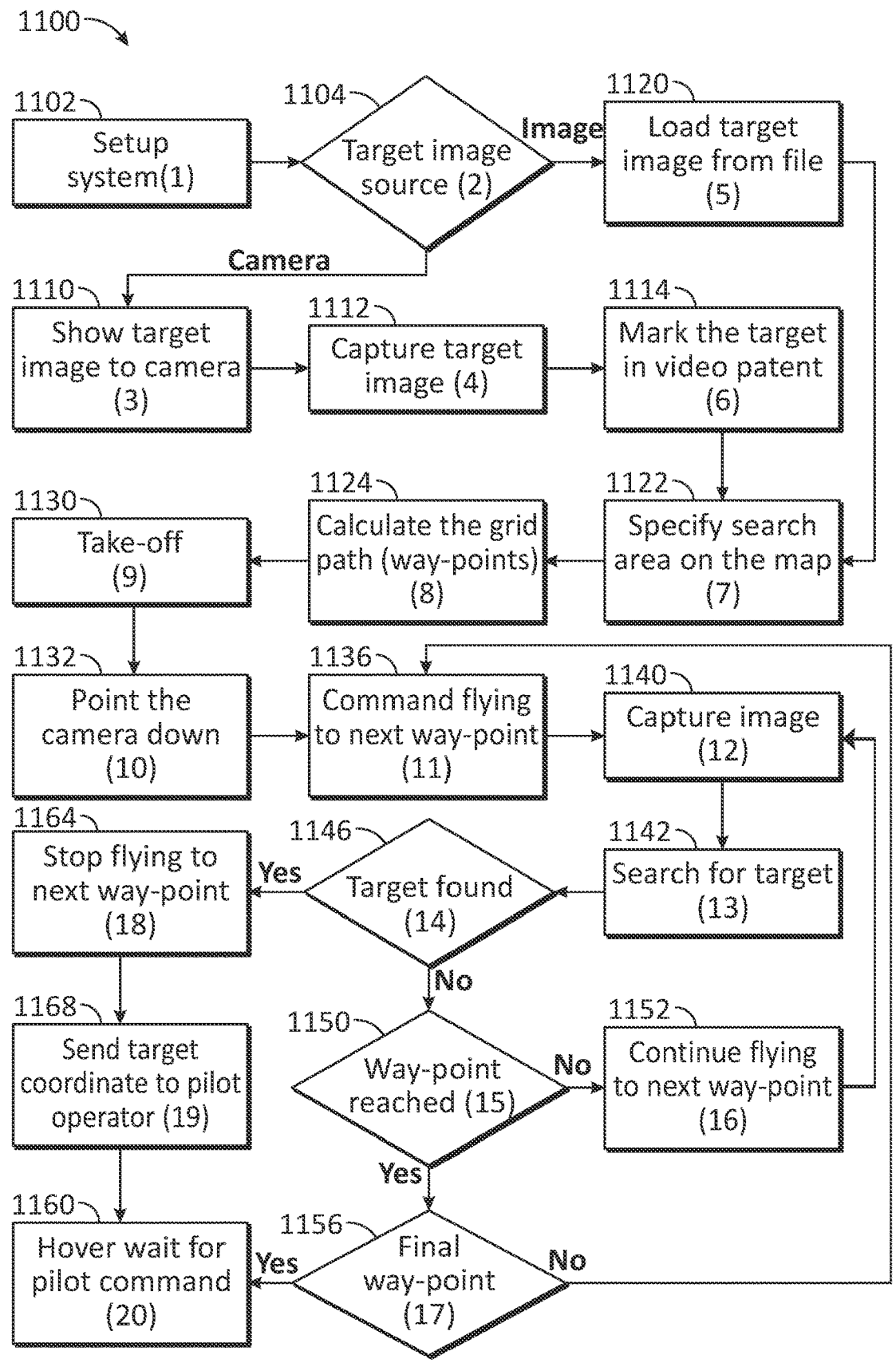
FIG. 11 illustrates a flow diagram of a search and rescue process using a UAV, in accordance with an embodiment of the disclosure.

FIG. 11 illustrates a flow diagram of a process 1100 of a search and rescue process using an UAV, in accordance with an embodiment of the disclosure. The operations of FIG. 11 may be implemented as software instructions executed by one or more logic devices or controllers associated with corresponding electronic devices, sensors, and/or structures depicted in FIGS. 1-9. More generally, the operations of FIG. 11 may be implemented with any combination of software instructions, mechanical elements, and/or electronic hardware (e.g., inductors, capacitors, amplifiers, actuators, or other analog and/or digital components). Any step, sub-step, sub-process, or block of process 1100 may be performed in an order or arrangement different from the embodiment illustrated by FIG. 11. For example, in other embodiments, one or more blocks may be omitted from or added to process 1100. Furthermore, block inputs, block outputs, various sensor signals, sensor information, calibration parameters, and/or other operational parameters may be stored to one or more memories prior to moving to a following portion of a corresponding process. Although process 1100 is described with reference to systems described in FIGS. 1-9, process 1100 may be performed by other systems different from those systems and including a different selection of electronic devices, sensors, assemblies, mechanisms, platforms, and/or platform attributes.

In block 1102, a UAV system may be started in a search and rescue mode. In this mode, the pilot of the UAV may be able to command the UAV to autonomously search for a specific target. In block 1104, the pilot may be given the option to either upload an image of the target through a user interface (e.g., a tablet) or by capturing an image of the target using a camera of the UAV.

If the pilot selects to use the camera of the UAV, the pilot may show a target image to the camera (block 1110). For example, the pilot may physically place a photo of the target at the front of the camera while the UAV is on the ground. The photo may be placed so that the target is fully visible in the user interface.

In block 1112, the pilot may capture an image of the target using the user interface. For example, a video panel of user interface may provide a video/image stream for the pilot to capture a good image. Using the video panel of the user interface, the pilot may mark the required target on the image (block 1114). This may facilitate search and rescue operations, such as reducing error in identifying the target. For example, this step may be important for the target search algorithm to avoid all unnecessary information in the image and focus only on the target.

If the pilot selects to upload an image, the user interface may show the list of all images on the storage of user interface, and the pilot may select and upload the required image of the target (block 1120).

In block 1122, the search area may be specified. For example, the pilot may select the search area in a map view of user interface, such as via a stylus or using a finger. The search area can be of any closed shape.

In block 1124, the system (e.g., the UAV) may calculate a path (e.g., an optimum path) that will cover the selected search area. The path may be composed of a set of waypoints on the map. The UAV may autonomously fly from one waypoint to another until the entire search area is covered. Using a GPS module, the UAV may maintain its height during flight. In block 1124, the frequency at which images are captured of the search area may be calculated, as noted above.

In block 1130, the pilot may command the UAV to take off. The UAV may autonomously ascend to the required height. In block 1132, the camera may be pointed down, such as automatically directed down (e.g., as shown in FIG. 3). This position may allow the UAV to take clear images of the search area. Other positions of the camera can be used as well depending on the terrain.

In block 1136, process 1100 may include commanding flight of UAV between waypoints. For instance, once the UAV reaches the desired height, the UAV may start flying to the first waypoint in the path. On-board flight computers may control the UAV during its flight from one waypoint to the next.

In block 1140, one or more images of the search area may be captured by the UAV. For instance, at the rate calculated in block 1124, images may be captured by camera. The images may be processed after capture in several stages, including: 1) converting to grey (which may be provided directly by the camera), 2) down-sampling the image, and 3) extracting important pixels that correspond to objects in the image.

In block 1142, the target image captured in block 1112 or block 1120 may be compared to parts of the images (i.e., patches of the images), as described above. In this way, a match for the target image may be found in the captured images. If a target is found, the target's location in the image may be transformed into a position in the world. This analysis may occur in real-time or near real-time as the UAV is flying.

In block 1146, the UAV will decide to either continue searching or stop based on the target search results. In the case the target is not found, the UAV may continue flying until it reaches the next waypoint. At block 1150, the system may check if the UAV has reached the target waypoint. If the target waypoint is not reached, the drone continues flying in the same trajectory towards the next waypoint (block 1152), with the process 1100 proceeding to block 1140 to capture more images and processing the images as explained above. If the target waypoint is reached, the system checks whether the waypoint is the final waypoint (block 1156). If the waypoint is the final waypoint, the UAV may hover in place, waiting for pilot command (block 1160). If the waypoint is not the final waypoint, the process 1100 may proceed back to block 1136 for continued flight of the UAV to the next waypoint.

When the target is detected in the image, the UAV may automatically stop flying to the next waypoint (block 1164). The system may keep an estimation of the UAV position in the world using one or more GPS modules or IMUS. Using this information, the position of the target may be calculated. In embodiments, the UAV may hover above the target (e.g., exactly at the top of the object), and the UAV's longitude and latitude may guide the rescue operation to the target position.

In block 1168, the pilot may be notified when the target is found. For example, the target position and a live video feed may be transmitted to the pilot on the user interface. If the target is found, the process 1100 may proceed to block 1160, where the UAV will continue hovering above the target while sending the video feed and updated target position. If the target is moving, the UAV may automatically follow the target and update target position.

Although a single UAV is described with reference to the search and rescue operations, multiple UAVs may cooperate to cover the search area. The same processes described above can be employed by each UAV in the fleet. The search area may be divided between the UAVs, with each UAV performing a respective grid search, as described herein. In embodiments, one or more UAVs may be equipped with a different payload, such as to carry first aid devices, for example, and deliver them to the target.

The present disclosure can also work with multiple targets. For instance, each target will be presented to the system. A descriptor may be created for each target and matched to all possible patches. The one or more UAVs may search for all presented targets. The behavior of the UAV(s) once a target is found can be configured for normal behavior or modified behavior. Normal behavior may be characterized as reporting target position, stop and hovering while providing a video feed of the found target. Modified behavior may be characterized as reporting the target position and an image of the target to the pilot, then continuing search for the remaining targets. If multiple UAVs are employed, once a target is found by one UAV, other UAVs may be notified to exclude the found target from their searches.

In general, each of the elements of present disclosure may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices.

In addition, one or more non-transitory mediums may be provided for storing machine readable instructions for loading into and execution by any logic device implemented with one or more of the devices. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of present disclosure using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element may include one or more modules supporting wired, wireless, and/or a combination of wired and wireless communication techniques. In some embodiments, various elements or portions of elements may be integrated with each other, for example, or may be integrated onto a single printed circuit board (PCB) to reduce system complexity, manufacturing costs, power requirements, coordinate frame errors, and/or timing errors between the various sensor measurements.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. An unmanned aerial vehicle (UAV) comprising:
a body;
a camera configured to capture one or more images of a search area;
a gimbal configured to secure the camera to the body and point the camera independent of a position and/or orientation of the body;
a plurality of navigation cameras configured to provide one or more images for a position estimation of the UAV, the plurality of navigation cameras comprising a front camera pointing in a direction of travel of the UAV and multiple side cameras pointing down and to the sides of the body;
at least one logic device configured to:
 receive a selection of the search area to be searched;
 calculate a flight pattern for searching the search area based on at least the selection, wherein the flight pattern comprises a plurality of waypoints that cover the search area;
 receive a target image; and
 analyze the one or more images of the search area to identify a target matching the target image, wherein analyzing the one or more images comprises:
  calculating a template descriptor based on the target image;
  creating one or more patch descriptors associated with one or more patches of each image of the one or more images;
  comparing, using a template matching algorithm, the template descriptor against each of the patch descriptors to calculate a correlation between the template descriptor and each of the one or more patch descriptors; and
  identifying the target based on the correlation between the template descriptor and each of the one or more patch descriptors.

2. The UAV of claim 1, wherein the at least one logic device is configured to send a notification to a user interface based on a match between the target and the target image, wherein the notification comprises geo-information to locate the target on the ground.

3. The UAV of claim 1, wherein the the at least one logic device comprises:
a first logic device, the first logic device configured to calculate the flight pattern; and
a second logic device, the second logic device configured to receive the target image and analyze the one or more images.

4. The UAV of claim 1, wherein the UAV comprises:
a GPS module for providing position measurements; and
one or more inertial measurement units configured to provide position estimation.

5. The UAV of claim 1, wherein the flight pattern comprises a grid path having the plurality of waypoints that cover the search area.

6. A system comprising:
the UAV of claim 1; and
a user interface configured to communicate with the UAV, wherein receiving the selection comprises using the user interface to receive user input identifying a search area, wherein the flight pattern is based on a terrain of the search area and a predicted size of the target.

7. A system comprising:
a user interface configured to receive user input selecting a search area;
an unmanned aerial vehicle (UAV) in communication with the user interface, the UAV comprising a camera configured to capture one or more images of the search area;
a flight module configured to calculate a flight pattern of the UAV for searching the search area based on at least the selection, wherein the flight pattern comprises a plurality of waypoints that cover the search area; and
an imagery module configured to:
 receive a target image; and
 analyze the one or more images of the search area to identify a target matching the target image, wherein analyzing the one or more images comprises:
  calculating a template descriptor based on the target image;
  creating one or more patch descriptors associated with one or more patches of each image of the one or more images;
  comparing, using a template matching algorithm, the template descriptor against each of the patch descriptors to calculate a correlation between the template descriptor and each of the one or more patch descriptors; and
  identifying the target based on the correlation between the template descriptor and each of the one or more patch descriptors.

8. The system of claim 7, wherein the UAV is configured to send a notification to the user interface based on a match between the target and the target image, wherein the notification comprises geo-information to locate the target on the ground, wherein the flight pattern is based on a terrain of the search area and a predicted size of the target.

9. The system of claim 7, wherein the camera comprises a thermal imager configured to capture thermal images in response to infrared radiation; and
the UAV further comprises:
 a body;
 a gimbal configured to secure the camera to the body and to point the camera independent of a position and/or orientation of the body;
 a plurality of navigation cameras configured to provide one or more images for a position estimation of the UAV, the plurality of navigation cameras comprising a front camera pointing in a direction of travel and multiple side cameras pointing down and to the sides of the body.

10. The system of claim 7, wherein:
the imagery module is configured to receive the target image through the target image being uploaded to the UAV using the user interface or by the target image being captured using the camera; and
the user interface is connected to the UAV using a wireless link and comprises:
 an image panel for viewing imagery captured by the camera; and
 an input panel for identifying the search area.

11. The system of claim 7, wherein the UAV is configured to:
fly the flight pattern autonomously;
calculate a frequency at which images are captured by the camera during flight based on one or more physical features of the search area; and
hover above the target while sending updated imagery and target position to the user interface.

12. The system of claim 7, wherein:
the system is configured to search for multiple targets in the search area; and/or the system is implemented using a plurality of UAVs configured to cooperate to cover the search area.

13. The system of claim 7, wherein:
the UAV is further configured to calculate a frequency at which images are captured by the camera during flight based on a concentration of obstructions within the search area; and
the user interface is further configured to display a map showing the flight pattern overlaid on the search area and a current position of the UAV along the flight pattern.

14. A method comprising:
receiving a target image;
receiving a selection of a search area to be searched;
calculating a flight pattern of an unmanned aerial vehicle (UAV) for searching the search area based on at least the selection, wherein the flight pattern comprises a plurality of waypoints that cover the search area;
capturing, using a camera of the UAV, one or more images of the search area;
estimating, using a plurality of navigation cameras, a position of the UAV, wherein the plurality of cameras comprises a front camera pointing in a direction of travel of the UAV and multiple side cameras pointing down and to the sides of the body; and
analyzing the one or more images to identify a target matching the target image, wherein analyzing the one or more images comprises:
calculating a template descriptor based on the target image;
creating one or more patch descriptors associated with one or more patches of each image of the one or more images;
comparing, using a template matching algorithm, the template descriptor against each of the patch descriptors to calculate a correlation between the template descriptor and each of the one or more patch descriptors; and
identifying the target based on the correlation between the template descriptor and each of the one or more patch descriptors.

15. The method of claim 14, wherein the receiving the target image comprises at least one of:
receiving the target image from a user interface; or
capturing the target image using the camera.

16. The method of claim 14, wherein the analyzing the one or more images comprises:
identifying the target if a highest correlation of the correlations exceeds a specific threshold; and
wherein the one or more patches include at least portions of the one or more images based on a probability that the target is located at least partially within the at least portions.

17. The method of claim 14, further comprising controlling a flight of the UAV along the flight pattern, wherein the controlling the flight comprises:
autonomously flying the UAV between the plurality of waypoints calculated for the search area; and
hovering the UAV above the target if the target is identified or a final waypoint of the plurality of waypoints if the target is not identified.

18. The method of claim 14, further comprising configuring the camera to capture the one or more images of the search area.

19. The method of claim 14, further comprising sending one or more notifications for display on a user interface based on a match between the target and the target image.

20. The method of claim 14, wherein the flight pattern comprises a grid path having the plurality of waypoints that cover the search area.

* * * * *

UNITED STATES PATENT AND TRADEMARK OFFICE
CERTIFICATE OF CORRECTION

| | |
|---|---|
| PATENT NO. | : 12,417,710 B2 |
| APPLICATION NO. | : 17/669321 |
| DATED | : September 16, 2025 |
| INVENTOR(S) | : Ahmed Elhossini and Fei Yu |

Page 1 of 1

It is certified that error appears in the above-identified patent and that said Letters Patent is hereby corrected as shown below:

In the Claims

Claim 3, Column 13, Line 43, change "wherein the the at least" to --wherein the at least--.

Signed and Sealed this
Twenty-eighth Day of October, 2025

John A. Squires
*Director of the United States Patent and Trademark Office*